US012679972B2

(12) United States Patent
Ito

(10) Patent No.: US 12,679,972 B2
(45) Date of Patent: Jul. 14, 2026

(54) RESIN COMPOSITION, MOLDED OBJECT, MODIFIER FOR POLYAMIDE RESIN, AND METHOD FOR MODIFYING POLYAMIDE RESIN

(71) Applicant: Mitsubishi Chemical Corporation, Tokyo (JP)

(72) Inventor: Takuya Ito, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 843 days.

(21) Appl. No.: 17/948,021

(22) Filed: Sep. 19, 2022

(65) Prior Publication Data

US 2023/0023558 A1 Jan. 26, 2023

Related U.S. Application Data

(63) Continuation of application No. PCT/JP2021/009135, filed on Mar. 9, 2021.

(30) Foreign Application Priority Data

Mar. 26, 2020 (JP) ................................ 2020-056183

(51) Int. Cl.
*C08L 77/00* (2006.01)

(52) U.S. Cl.
CPC .................................... *C08L 77/00* (2013.01)

(58) Field of Classification Search
CPC ........... C08L 77/00; C08L 67/04; C08L 77/02
See application file for complete search history.

(56) References Cited

U.S. PATENT DOCUMENTS

| | | | |
|---|---|---|---|
| 4,500,677 | A | 2/1985 | Maruhashi et al. |
| 4,724,185 | A | 2/1988 | Shah |
| 4,952,628 | A | 8/1990 | Blatz |
| 4,990,562 | A | 2/1991 | Chou et al. |
| 5,068,077 | A | 11/1991 | Negi et al. |
| 2015/0133605 | A1 | 5/2015 | Sato et al. |
| 2020/0079940 | A1 | 3/2020 | Usui et al. |

FOREIGN PATENT DOCUMENTS

| | | | |
|---|---|---|---|
| CN | 104334634 | A | 2/2015 |
| CN | 110637059 | A | 12/2019 |
| EP | 0787755 | A2 | 8/1997 |
| EP | 2857451 | A1 | 4/2015 |
| JP | S58-129035 | A | 8/1983 |
| JP | S61-002778 | A | 1/1986 |
| JP | S62-97840 | A | 5/1987 |
| JP | S63-114845 | A | 5/1988 |
| JP | S64-90259 | A | 4/1989 |
| JP | H02-245043 | A | 9/1990 |
| JP | H09-208838 | A | 8/1997 |
| JP | H10-46026 | A | 2/1998 |
| JP | 2001-049069 | A | 2/2001 |
| JP | 2002-337278 | A | 11/2002 |
| JP | 2003-213123 | A | 7/2003 |
| JP | 2009-191871 | A | 8/2009 |
| JP | 2013-209588 | A | 10/2013 |
| JP | 2013-245318 | A | 12/2013 |
| JP | 2019-104828 | A | 6/2019 |
| JP | 2019-163379 | * | 9/2019 |

OTHER PUBLICATIONS

Espacenet Translation of JP 2019-163379 Description (Year: 2019).*
Office Action issued in corresponding Japanese Patent Application No. 2022-509518, dated Oct. 1, 2024.
Extended European Search Report issued in counterpart European Patent Application No. 21776516.3 dated Aug. 1, 2023.
Office Action issued Feb. 21, 2024 for Chinese Patent Application No. 202180022206.2.
International Search Report issued in corresponding International Patent Application No. PCT/JP2021/009135 dated May 25, 2021.
International Preliminary Report on Patentability and Written Opinion issued in corresponding International Patent Application No. PCT/JP2021/009135 dated Oct. 6, 2022.

* cited by examiner

*Primary Examiner* — John M Cooney
*Assistant Examiner* — Adam J Berro
(74) *Attorney, Agent, or Firm* — Morgan, Lewis & Bockius LLP

(57) ABSTRACT

The resin composition of the present disclosure contains a polyamide resin (A) and a modified ethylene-vinyl alcohol resin (B) grafted with an aliphatic polyester, wherein the content of the modified ethylene-vinyl alcohol resin is 1 part by weight or more and less than 50 parts by weight, when the total content of the polyamide resin (A) and the modified ethylene-vinyl alcohol resin (B) is taken as 100 parts by weight. This resin composition has excellent moldability and has excellent mechanical strength, in particular excellent tensile fracture strain properties, without impairing the transparency and solvent resistance of a molded object obtained from the resin composition.

15 Claims, No Drawings

RESIN COMPOSITION, MOLDED OBJECT, MODIFIER FOR POLYAMIDE RESIN, AND METHOD FOR MODIFYING POLYAMIDE RESIN

RELATED APPLICATIONS

This application ix a continuation of International Application No. PCT/JP2021/009135, filed on Mar. 9, 2021, which claims priority to Japanese Patent Application No. 2020-056183, filed on Mar. 26, 2020, the entire contents of each of which are herein incorporated by reference.

TECHNICAL FIELD

The present disclosure relates to a resin composition containing a polyamide resin and a modified ethylene-vinyl alcohol resin grafted with an aliphatic polyester, and the like, and more specifically relates to a resin composition for producing a molded object having excellent moldability and also having excellent transparency, tensile fracture strain properties, and solvent resistance, the molded object, a polyamide resin modifier therefor, and a method for modifying a polyamide resin.

BACKGROUND ART

Conventionally, polyamide resins are widely used as engineering plastics in various industrial fields including the automotive industry due to their excellent shock resistance, chemical resistance, abrasion resistance, and the like.

Recently, the need for polyamide resins has expanded to include applications where they are used in harsher environments, and various proposals have been made to further increase the mechanical strength of molded products made of polyamide resins.

For example, in order to obtain molded objects that exhibit excellent shock resistance even at extremely low temperatures of −40° C. or lower, a technique has been proposed to blend polyamide resins with olefin elastomers and the like (see PTL 1).

CITATION LIST

Patent Literature

PTL 1: JP-A-2049-191871

SUMMARY

Technical Problem

However, since polyamide resins and olefin elastomers are not miscible with each other, there is an issue in that, when a polyamide resin is blended with an olefin elastomer to obtain a molded object as described above, the transparency of the molded object is reduced. Furthermore, since the solvent resistance is reduced, there is also an issue of limited applications.

The present disclosure was made in view of these circumstances and provides a resin composition containing a polyamide resin as a main component, having improved mechanical strength, in particular, improved tensile fracture strain properties, without impairing the transparency and solvent resistance of a molded object obtained from the resin composition, a molded object made of the resin composition, a polyamide resin modifier for modifying a polyamide resin, and a method for modifying a polyamide resin.

Solution to Problem

The present inventor conducted an in-depth study in order to realize a modifying method for improving the mechanical strength of a resin composition containing a polyamide resin as a main component without impairing the transparency and solvent resistance of a molded object obtained from the resin composition, and found that if a specific modified ethylene-vinyl alcohol resin that is miscible with a polyamide resin is blended into the polyamide resin at a specific ratio, it is possible to obtain a molded object having excellent moldability and transparency that is unlikely to be impaired and also having improved tensile fracture strain properties and solvent resistance.

The present disclosure provides [1] to [9] below.

[1] A resin composition containing: a polyamide resin (A); and a modified ethylene-vinyl alcohol resin (B) grafted with an aliphatic polyester, wherein the content of the modified ethylene-vinyl alcohol resin (B) is 1 part by weight or more and less than 50 parts by weight, when the total content of the polyamide resin (A) and the modified ethylene-vinyl alcohol resin (B) is taken as 100 parts by weight.

[2] The resin composition according to [1], in which the content of the modified ethylene-vinyl alcohol resin (B) is 1 to 45 parts by weight, when the total content of the polyamide resin (A) and the modified ethylene-vinyl alcohol resin (B) is taken as 100 parts by weight.

[3] The resin composition according to [1] or [2], in which a modification rate of the modified ethylene-vinyl alcohol resin (B) is 0.1 mol % to 30 mol %.

[4] The resin composition according to any one of [1] to [3], in which, in the modified ethylene-vinyl alcohol resin (B), the grafted aliphatic polyester is a ring-opening polymer of a lactone ring, and the number of carbon atoms constituting the lactone ring is 3 to 10.

[5] The resin composition according to any one of [1] to [4], in which the total haze of a 30 μm-thick single-layer film obtained using the resin composition is 2% or less, as measured using a haze meter (NDH2000 manufactured by Nippon Denshoku Industries Co., Ltd.) as defined in JTS K7105.

[6] A molded object made of the resin composition according to any one of [1] to [5].

[7] The molded object according to [6], in which the molded object is a sheet or a film.

[8] A polyamide resin modifier constituted by a modified ethylene-vinyl alcohol resin (B) grafted with an aliphatic polyester.

[9] A method for modifying a polyamide resin (A) by blending a modified ethylene-vinyl alcohol resin (B) grafted with an aliphatic polyester into the polyamide resin (A), including: setting the content of the modified ethylene-vinyl alcohol resin (B) to 1 part by weight or more and less than 50 parts by weight, when the total content of the polyamide resin (A) and the modified ethylene-vinyl alcohol resin (B) is taken as 100 parts by weight.

As described above, the present disclosure is directed to a resin composition containing a polyamide resin (A) as a main component, in which, for the purpose of modification, a specific modified ethylene-vinyl alcohol resin (B) that is miscible with the polyamide resin (A) is blended into the polyamide resin (A) at a specific ratio.

Note that, in the description below, "ethylene-vinyl alcohol resin" may be abbreviated as "EVOH," and "modified EVOH grafted with an aliphatic polyester" may be abbreviated as "aliphatic-polyester-modified EVOH" or "modified EVOH."

Advantageous Effects

According to the above-described resin composition, since the polyamide resin (A) and the aliphatic-polyester-modified EVOH (Q) are miscible with each other, an amorphous part of the polyamide resin (A) and the modified EVOH (B) are fully dissolved in each other, and thus the resin composition has a lower glass transition temperature (Tg), excellent tensile fracture strain properties, and excellent moldability. Accordingly, a molded object obtained from the above-described resin composition is advantageous in that its original transparency and solvent resistance are not impaired and excellent quality is maintained.

Furthermore, according to the polyamide resin modifier and the method for modifying a polyamide resin of the present disclosure, a polyamide resin with the above excellent properties can be provided merely by blending the modifier into the polyamide resin.

DESCRIPTION OF EMBODIMENT

Hereinafter, an embodiment of the present disclosure will be described in detail, but the present disclosure is not limited to these descriptions.

First, the resin composition of the present disclosure contains a polyamide resin (A) and an aliphatic-polyester-modified EVOH (B), and these components will be sequentially described respectively in the following sections.

Polyamide Resin (A)

There is no particular limitation on the polyamide resin (A) that is used in the present disclosure, and examples thereof include commonly used polyamide resins such as polycaproamide (Nylon 6), poly-ω-aminoheptanoic acid (Nylon 7), poly-ω-aminononanoic acid (Nylon 9), polyundecanamide (Nylon 11), polylaurylactam (Nylon 12), and other homopolymers. Furthermore, examples of the copolymerized polyamide resin include aliphatic polyamides such as polyethylenediamine adipamide (Nylon 26), pilytetramethylene adipamide (Nylon 46), polyhexamethylene adipamide (Nylon 66), polyhexamethylene sebacamide (Nylon 610), polyhexamethylene dodecamide (Nylon 612), polyoctamethylene adipamide (Nylon 86), polydecamethylene adipamide (Nylon 108), caprolactam/lauryl lactam copolymer (Nylon 6/12), caprolactam/ω-aminononanoic acid copolymer (Nylon 6/9), caprolactam/hexamethylene diammonium adipate copolymer (Nylon 6/66), lauryl lactam/hexamethylene diammonium adipate copolymer (Nylon 12/66), ethylenediamine adipamide/hexamethylene diammonium adipate copolymer (Nylon 26/66), caprolactam/hexamethylene diammonium adipate/hexamethylene diammonium sebacate copolymer (Nylon 66/610), and ethyleneammonium adipate/hezamethylene diammonium adipate/hexamethylene diammonium sebacate copolymer (Nylon 6/66/610), as well as aromatic polyamides such as polyhexamethylene isophthalamide, polyhexamethylene terephthalamide, polymetaxylylene adipamide, hexamethylene isophthalamide/terephthalamide copolymer, poly-p-phenylene terephthalamide, and poly-p-phenylene-3,4'-diphenylether terephthalamide, amorphous polyamides, these polyamide resins modified with aromatic amine such as methylene benzylamine and meta-zylenediamine, and meta-xylenediammomnium adipate. Examples thereof further include their end-modified polyamide resins, and it is preferable to use end-modified polyamide resins. These polyamide resins can be used alone or in a combination of two or more.

The melting point of the polyamide resin (A) is preferably 160° C. to 270° C., more preferably 180° C. to 250° C., and even more preferably 200° C. to 230° C. If the melting point of the polyamide resin (A) is too low, the thermal resistance of the resin composition tends to be impaired. On the other hand, if the melting point of the polyamide resin (A) is too high, when the polyamide resin (A) and the aliphatic-polyester-modified EVOH (B) are blended in a twin-screw extruder, the die temperature tends to be too high and the blended resin composition tends to deteriorate thermally.

In view of the above, for example, the polyamide resin (A) is preferably Nylon 6 (melting point: about 220° C.) or Nylon 6/66 (melting point: about: 200° C.).

Aliphatic-Polyester-Modified EVOH (B)

Next, the aliphatic-polyester-modified EVOH (B) that is used together with the polyamide resin (A) will be described.

The aliphatic-polyester-modified EVOH (B) is a resin obtained by grafting a hydrozyl group of the EVOH with an aliphatic polyester.

The EVOH is typically a resin obtained through saponification of an ethylene-vinyl ester copolymer, which is a copolymer of ethylene and a vinyl ester monomer, and a water-insoluble thermoplastic resin.

Polymerization of the above-mentioned ethylene and vinyl ester monomer can be performed using any known polymerization method such as solution polymerization, suspension polymerization, or emulsion polymerization, and solution polymerization using methanol as a solvent is typically used. Saponification of the obtained ethylene-vinyl ester copolymer can also be performed using any known method.

The EVOH produced in this way mainly contains ethylene-derived structural units and vinyl alcohol structural units, and usually contains a small amount of vinyl ester structural units that remain unsaponified.

As the vinyl ester monomer, vinyl acetate is typically used because of its good market availability and efficiency in treating impurities during production. Examples of other vinyl ester monomers include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate, and it is possible to use aliphatic vinyl esters typically with 3 to 20 carbon atoms, preferably with 4 to 10 carbon atoms, and more preferably with 4 to 7 carbon atoms. These vinyl ester monomers can be used alone or in a combination of two or more.

The content of ethylene structural units in the EVOH can be controlled using the pressure of ethylene in the copolymerization of a vinyl ester monomer and ethylene, and ix typically 20 mol % to 60 mol %, preferably 25 mol % to 50 mol %, and even more preferably 30 mol % to 45 mol %. If the content is too low, the melt moldability tends to be impaired. On the other hand, if the content is too high, the gas barrier property tends to be impaired.

The content of ethylene structural units can be measured as defined in ISO 14663.

Furthermore, the degree of saponification of the vinyl ester component in the EVOH can be controlled using the amount of a saponification catalyst (an alkaline catalyst such as sodium hydroxide is typically used), temperature, time, and the like when saponifying the ethylene-vinyl ester copolymer, and is typically 10 mol % to 100 mol %, preferably 95 mol % to 100 mol %, and more preferably 99 mol % to 100 mol %. If the degree of saponification is too low, the gas barrier property, thermal stability, moisture resistance, and the like tend to be impaired.

The degree of saponification of the EVOH can be measured as defined in JIS K6726 (note: EVOH is used as a solution dissolved uniformly in water/methanol solvent).

Furthermore, the EVOH may further contain structural units derived from the comonomers listed below, as long as the effects of the present disclosure are not inhibited (e.g., in an amount of 10 mol % or less of the EVOH).

Examples of the comonomers include: olefins such as propylene, 1-butene, and isobutene; hydroxy-group-containing α-olefins such as 3-butene-1-ol, 3-butene-1,2-diol, 4-pentene-1-ol, and 5-hexene-1,2-diol, and their derivatives such as esterified products and acylated products; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (phthalic anhydride), maleic acid (maleic anhydride), and itaconic acid (itaconic anhydride), and their salts and mono- and dialkylesters having an alkyl group with 1 to 16 carbon atoms; acrylamides such as acrylamide, N-alkylacrylamide having an alkyl group with 1 to 18 carbon atoms, N,N-dimethylacrylamide, 2-acrylamidepropanesulfonic acid and its salt, acrylamidepropyldimethylamime and its acid salt and quaternary salt; methacrylamides such as methacrylamide, N-alkylmethacrylamide having an alkyl group with 1 to 18 carbon atoms, N,N-dimethylmethacrylamide, 2-methacrylamidepropanesulfonic acid and its salt, methacrylamidepropyldimethylamine and its acid salt and quaternary salt; N-vinylamide such as N-vinylpyrrolidone, N-vinylformamide, and N-vinylacetamide; vinyl cyanides such as acrylnitrile and methacrylnitrile; vinyl ethers such as alkyl vinyl ether having an alkyl group with 1 to 18 carbon atom-, hydroxyalkyl vinyl ether, and alkoxyalkyl vinyl ether; vinyl halide compounds such as vinyl chloride, vinylidene chloride, vinyl fluoride, vinylidene fluoride, and vinyl bromide; vinylsilanes such as trimethoxy vinylsilane; allyl halides such as allyl acetate and allyl chloride; allyl alcohols such as allyl alcohol and dimethylallyl alcohol; and trimethyl-(3-acrylamide-3-dimethylpropyl)-ammonium chloride, acrylamide-2-methylpropanesulfonic acid, and the like. These comonomers can be used alone or in a combination of two or more.

In particular, from the viewpoint of good secondary moldability such as stretch processability and vacuum/pressure moldability, an EVOH having a side chain with a primary hydroxyl group is preferable, and an EVOH having a side chain with a 1,2-diol structure is more preferable.

Furthermore, the EVOH that is used in the present disclosure may be "post-modified" such as those subjected to urethanation, acetalization, cyanoethylation, oxyalkylenation, acylation, or the like.

Furthermore, the EVOH that is used in the present disclosure may be a mixture combined with other EVOHs. Examples of the other EVOHs include those with different degrees of saponification, different degrees of polymerization, and different copolymerized components.

Next, a method for obtaining an aliphatic-polyester-modified EVOH (B) that is used in the present disclosure using the above-described EVOH will be described.

Examples of the method for modifying the EVOH include a method (1) in which ring-opening polymerization of lactones is performed in the presence of the EVOH and a method (2) in which ring-opening polymerization or condensation polymerization of an aliphatic polyester or lactones is performed to obtain polyesters having carboxy groups at the ends, and the polyesters having carboxy groups at the ends are then reacted with the EVOH.

In particular, the method in which ring-opening polymerization of lactones is performed in the presence of the EVOH makes it possible to easily obtain an EVOH resin grafted with an aliphatic polyester through one reaction stage, and, due to the smaller number of steps and ease with which it can be carried out, this method is preferable to the method in which ring-opening polymerization or condensation polymerization is performed in advance to produce an aliphatic polyester, which is then reacted with the EVOH.

The above-mentioned lactones are preferably lactones with 3 to 10 carbon atoms constituting a ring that forms an aliphatic polyester in response to ring-opening polymerization. Such lactones are represented by the following general formula (1) below when they have no substituents.

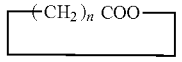

(1)

In the general formula (1) above, n is an integer of 2 to 9, and n is preferably from 4 to 5. Furthermore, any carbon atom of the alkylene chain $—(CH_2)_6—$ in the general formula (1) above may have at least one substituent such as a lower alkyl group or lower alkoxy group with about 1 to 6 carbon atoms, a cycloalkyl group, a phenyl group, or an aralkyl group.

Specific examples of the lactones include β-propiolactones, γ-butyrolactones, ε-caprolactones, and δ-valerolactones.

Examples of β-propiolactones include β-propiolactone and dimethylpropiolactone.

Examples of γ-butyrolactones include butyrolactone, γ-valerclactone, γ-caprolactone, γ-caprylolactone, γ-laurolactone, γ-palmitolactone, γ-stearolactone, crotonolactone, α-angelicalactone, and β-angelicalactone.

Examples of ε-caprolactones include a monoalkyl-ε-caprolactone such as ε-caprolactone, monomethyl-ε-caprolactone, monoethyl-ε-caprolactone, monodecyl-ε-caprolactone, monopropyl-ε-caprolactone, and monodecyl-ε-caprolactone; dialkyl-ε-caprolactone with two alkyl groups respectively substituted by carbon atoms at positions other than the ε-position; trialkyl-ε-caprolactone with three alkyl groups respectively substituted by carbon atoms at positions other than the ε-position; alkoxy-ε-caprolactone such as ethoxy-ε-caprolactone; cycloalkyl-lactone such as cyclohexyl-ε-caprolactone; aralkyl-ε-caprolactone such as benzyl-ε-caprolactone; and aryl-ε-caprolactone such as phenyl-ε-caprolactone.

Examples of δ-valerolactones include 5-valerolactone, 3-methyl-5-valerolactone, 3,3-dimethyl-5-valerolactone, 2-methyl-5-valerolactone, and 3-ethyl-5-valerolactone.

These lactones can be used alone or in a combination of two or more.

Of these lactones, in particular, ε-caprolactones and δ-valerolactones are preferable, and ε-caprolactone is especially preferable because it is inexpensive and readily available.

Furthermore, for reactions involving ring-opening polymerization, it is preferable to add a conventionally known ring-opening polymerization catalyst. Examples of ring-opening polymerization catalysts include a titanium compound and a tin compound. Specific examples thereof include a titanium alkoxide such as tetra-n-butoxy titanium, tetra tetraisobutoxy titanium, and tetraisopropoxy titanium; a tin alkoxide such as dibutyl dibutoxy tin; and a tin esterified product such as dibutyl tin diacetate. Of these ring-opening polymerization catalysts, tetra-n-butoxy titanium is preferable because it is inexpensive and readily available.

The above-described reaction can also be caused to occur in a heated and melted state in a kneading machine such as a single-screw or twin-screw extruder, a Banbury mixer, a kneader, or a Brabender.

Furthermore, there is no particular limitation on the reaction time and temperature of the ring-opening polymerization, and they may be selected as appropriate, but the ring-opening polymerization is performed preferably at 50° C. to 250° C. for 10 seconds to 24 hours with stirring, and more preferably at 150° C. to 230° C. for 5 minutes to 10 hours with stirring. If the reaction time is shorter than the lower limit value or the reaction temperature is lower than the lower limit value, the graft reaction rate decreases and unreacted compounds tend to bleed out from the molded object, thus worsening the surface appearance. On the other hand, if the reaction time is longer than the upper limit value or the reaction temperature is higher than the upper limit value, cross-linking between modified EVOHs tends to occur, causing appearance defects such as fish eyes in the molded object.

In the aliphatic-polyester-modified EVOH (B) obtained in this manner, the content of EVOH units constituting the stem of the above-described modified EVOH (B) is typically 40 wt. % to 99 wt. %, preferably 45 wt. % to 95 wt. %, and more preferably 50 wt. % to 90 wt. %, and the content of aliphatic polyester units grafted to the trunk is typically 1 wt. % to 60 wt. %, preferably 5 wt. % to 55 wt. %, and more preferably 10 wt. % to 50 wt. %. If the content of EVOH units is too high, the mechanical strength, in particular the tensile fracture strain properties, are not improved and the miscibility with the polyamide resin (A) decreases, and thus the effects of the present disclosure are not likely to be obtained. On the other hand, if the content of EVOH units is too low, the adhesiveness is strong and blocking of the molded object tends to occur. The content of EVOH units in the aliphatic-polyester-modified EVOH (B) and the content of aliphatic polyester units grafted therewith can be calculated from $^1$H-NMR measurement results.

Furthermore, the number-average molecular weight (in terms of standard polystyrene as measured through GPC) of the aliphatic-polyester-modified EVOH (B) is typically 5,000 to 300,000, preferably 10,000 to 200,000, and more preferably 10,000 to 100,000. If the number-average molecular weight of the modified EVOH (B) is too high, the melt viscosity tends to be too high and the dispersibility in the polyamide resin (A) serving as a main component tends to decrease. On the other hand, if the number-average molecular weight of the modified EVOH (B) is too low, the melt viscosity tends to be too low and stable melt molding tends to be difficult. The number-average molecular weight of the modified EVOH (B) can be calculated from GPC measurement results.

The rate of modification through grafting with an aliphatic polyester in the aliphatic-polyester-modified EVOH (B) (which is also referred to as "graft modification rate" or simply as "modification rate" hereinafter) is typically 0.1 mol % to 30 mol %, preferably 1 mol % to 25 mol %, and more preferably 5 mol % to 20 mol %. If the modification rate is too low, the mechanical strength, in particular the tensile fracture strain properties imparted by a modifier, are poor, and the miscibility with the polyamide resin (A) decreases, and thus effects of the present disclosure are not likely to be obtained. On the other hand, if the modification rate is too high, the adhesiveness is strong and blocking of the molded object tends to occur. The modification rate can be calculated from $^1$H-NMR measurement results.

Furthermore, the average chain length of aliphatic polyester units grafted to the trunk of the aliphatic-polyester-modified EVOH (B) is typically 1 mol to 15 mol, preferably 1 mol to 10 mol, and more preferably 1 mol to 8 mol. If the average chain length of the grafted aliphatic polyester units is too long, the adhesiveness is strong and blocking of the molded object tends to occur. The average chain length of aliphatic polyester units can be calculated from $^1$H-NMR measurement results.

Specifically, the rate of modification through grafting with an aliphatic polyester in the aliphatic-polyester-modified EVOH (B) and the average chain length of the grafted aliphatic polyester can be calculated by performing $^1$H-NMR measurements under the following conditions.

(a) $^1$H-NMR Measurement Conditions

Internal standard substance: Tetramethylsilane

Solvent: d6-DMSO

Measured polymer concentration: 5 wt. % (0.1 g of sample and 2 mL of solvent)

Measurement temperature: 50° C. (323K)

Irradiation pulse: 45°

Pulse interval: 10 sec

Number of totalizations: 16

(b) Attribution of Resonance Absorption Peaks (I) 0.8 ppm to 0.9 ppm: $—CH_3$ at aliphatic-polyester-modified EVOH end (II) 1.0 ppm to 1.9 ppm: $—CH_2—$ at aliphatic-polyester-modified EVOH main chain, and $—CH_2—$ portions that are adjacent to each other in aliphatic polyesters (III) 2.0 ppm: $—CH_3$ of residual acetyl group of aliphatic-polyester-modified EVOH (IV) 2.1 ppm to 2.3 ppm: $—CH_2—$ adjacent to carboxy group of aliphatic polyester (V) 3.3 ppm to 4.0 ppm: —CH— adjacent to —OH of aliphatic-polyester-modified EVOH, and $—CH_2—$ adjacent to —OH of aliphatic polyester (v) 4.0 ppm to 4.7 ppm: —OH of aliphatic-polyester-modified EVOH and aliphatic polyester, and $—CH_2—$ adjacent to ester bond of aliphatic polyester (c) Calculation of Graft Modification Rate and Average Chain Length of Aliphatic Polyester Using the integral values of the resonance absorption peaks in (I) to, (VI) above, the simultaneous equations (i) to (vi) below were formulated, and the amount of graft-modified groups C (mol) and the average chain length n (mol) of the aliphatic polyester were calculated from the solutions of the simultaneous equations. Furthermore, the graft modification rate X (mol %) of the aliphatic polyester was calculated from equation (vii).

$$3\times M=[\text{integral value of peak } (i)] \quad \text{Equation (i):}$$

$$(2\times M)+(2\times A)+(4\times E)+(2\times O)+(6\times n+2)\times C=[\text{integral value of peak } (II)] \quad \text{Equation (ii):}$$

$$3\times A=(\text{integral value of peak } (III)) \quad \text{Equation (iii):}$$

$$2\times n\times C=(\text{integral value of peak } (IV))\quad \text{Equation (iv):}$$

$$O+(2\times C)=[\text{integral value of peak } (V)]\quad \text{Equation (v):}$$

$$O+(2\times n-1)\times C=[\text{integral value of peak } (VI)]\quad \text{Equation (vi):}$$

$$X=C/(M+A+O+C+E)\times 100\quad \text{Equation (vii):}$$

where M, A, O, C, n, E, and X represent the following values.

M: Amount of methyl groups at end of aliphatic-polyester-modified EVOH (mol)

A: Amount of acetyl groups in aliphatic-polyester-modified EVOH (mol)

O: Amount of hydrozyl groups in aliphatic-polyester-modified EVOH (mol)

C: Amount of aliphatic polyester graft-modified groups in aliphatic-polyester-modified EVOH (mol)

n: Average chain length of aliphatic polyester (mol)

E: Amount of ethylene groups in aliphatic-polyester-modified EVOH (mol)

X: Graft modification rate of aliphatic-polyester-modified EVOH (mol %)

Furthermore, the glass transition temperature (Tg) of the aliphatic-polyester-modified EVOH (B) that is used in the present disclosure is typically −50° C. to 60° C., preferably −30° C. to 45° C., and more preferably −10° C. to 35° C. If the glass transition temperature is too low, blocking of the molded object tends to occur. On the other hand, if the glass transition temperature is too high, effects of the present disclosure are not likely to be obtained. The glass transition temperature can be measured using a differential scanning calorimeter.

Specifically, the glass transition temperature of the aliphatic-polyester-modified EVOH (B) can be calculated by performing measurements using a differential scanning calorimeter under the following conditions.

(a) Conditioning of test piece: The test piece was melted at 230° C. for 1 minute and then cooled to −30° C. at a cooling rate of 10° C./min.

(b) Analysis of glass transition temperature: The test piece cooled in (a) was heated to 230° C. at a temperature rise rate of 10° C./min.

(c) Calculation of glass transition temperature: The glass transition temperature was calculated as a midpoint temperature of a stepwise change portion of the glass transition from the DSC curve obtained in (b).

Furthermore, the MFR (Melt Flow Rate) of the aliphatic-polyester-modified EVOH (B) is typically 0.5 g/10 min to 100 g/10 min, preferably 1 g/10 min to 50 g/10 min, and more preferably 3 g/10 min to 35 g/10 min. If the MER is too large, the melt viscosity of the modified EVOH (B) tends to be too low and stable melt molding tends to be difficult. On the other hand, if the MFR is too small, the melt viscosity of the modified EVOH (B) tends to be too high and the dispersibility in the polyamide resin (A) tends to be impaired.

The MFR is an indicator of the degree of polymerization of EVOH serving as the trunk of the modified EVOH (B) and can be adjusted by the amount of polymerization initiator and the amount of solvent when copolymerizing monomers.

Resin Composition

Next, the resin composition of the present disclosure will be described.

The resin composition of the present disclosure is a resin composition containing the above-described polyamide resin (A) and the above-described aliphatic-polyester-modified EVOH (B).

The content ratio of the polyamide resin (A) and the aliphatic-polyester-modified EVOH (B) is set such that the content of the modified EVOH (B) is 1 part by weight or more and less than 50 parts by weight when the total content of the polyamide resin (A) and the modified EVOH (B) is taken as 100 parts by weight.

That is to say, the lower limit of the content of the modified EVOH (B) is 1 part by weight, preferably 5 parts by weight or more, and more preferably 10 parts by weight or more. The upper limit of the content of the modified EVOH (B) is less than 50 parts by weight, preferably 45 parts by weight or less, more preferably 40 parts by weight or less, even more preferably 30 parts by weight or less, and even more preferably 20 parts by weight or less. Of these ranges, the content of the modified EVOH (B) is preferably 1 part by weight or more and 45 parts by weight or less, more preferably 1 part by weight or more and less than 40 parts by weight, and even more preferably 1 part by weight or more and less than 20 parts by weight.

That is to say, if the content of the modified EVOH (B) is too large and exceeds the above-described range, the miscibility of the two resins (A) and (B) tends to be unbalanced; the transparency, the solvent resistance, and the moldability of the obtained molded object tend to be impaired; and, furthermore, the effect of improving the tensile fracture strain properties tends to be lost. On the other hand, if the content of the modified EVOH (B) is too small, the effect of modifying the polyamide resin (A) tends to be lost.

Note that the resin composition of the present disclosure may further contain, as other components, additives such as a carboxylic-acid-modified polyolefin resin (C), a hydrocarbon resin with a number-average molecular weight of 100 to 3,000, and a softening point of 60° C. or more and less than 170° C., an antioxidant, a lubricant, an antistatic agent, a colorant, an ultraviolet absorber, a plasticizer, a thermal stabilizer, a light stabilizer, a surfactant, an antibacterial agent, a drying agent, an antiblocking agent, a flame retardant, a cross-linking agent, a curing agent, a foaming agent, a crystal nucleating agent, an antifogging agent, a biodegradable additive, and a silane coupling agent, as appropriate, as long as the effects of the present disclosure are not inhibited (e.g., in an amount of 5 wt. % or less of the entire resin composition).

Preparation of Resin Composition

Next, a method for obtaining the resin composition of the present disclosure will be described.

It is possible to prepare the resin composition of the present disclosure by mixing the polyamide resin (A) and the modified EVOH (B) described above, and optional components that are blended as necessary.

There is no particular limitation on the mixing method, and the components can be dry-blended and used directly. However, a method is typically employed in which the components are mixed using a melt-mixing method, a solution-mixing method, or the like, and then molded into pellets or other easy-to-handle shapes to prepare the resin composition, but a melt-mixing method is preferable from the viewpoint of productivity.

Examples of melt-mixing methods include a method in which the components are dry-blended and then melted and mixed, as well as methods using known kneading equipment such as a kneader-ruder, an extruder, a mixing roll, a Banbury mixer, or a plastomill, but, from an industrial point of view, it is typically preferable to use a single-screw or twin-screw extruder, and it is also preferable to use a vent suction device, a gear pump device, a screen device, and the like, as necessary.

The melt-kneading temperature is typically set to 160° C. to 300° C., preferably 200° C. to 260° C., and more preferably 210° C. to 240° C., as the setting temperature of the extruder and die. If the temperature is too low, the resin is unlikely to melt and the processing state would be made unstable. On the other hand, if the temperature is too high, the resin composition tends to thermally deteriorate, and the quality of the resulting molded object tends to be impaired.

Molded Object

Next, a molded object that is obtained using the resin composition of the present disclosure will be described.

The resin composition of the present disclosure is typically provided as molded objects given various shapes according to the purpose, such as films, sheets, containers, fibers, rods, and tubes, obtained through melt molding or the like. The applications include a wide variety of uses such as packaging materials, fibers, daily necessities, name appliance parts, automotive parts, medical parts, and civil engineering and construction materials.

As described above, a molded object that is obtained using the resin composition of the present disclosure is a product in which an amorphous part of the polyamide resin (A) and the modified EVOH (B), serving as resin components, are fully dissolved in each other, and thus the resin composition has a lower glass transition temperature (Tg) and excellent tensile fracture strain properties. Moreover, this molded object is advantageous in that its original transparency and solvent resistance are not impaired and excellent quality is maintained.

The total haze of a 30 μm-thick single-layer film that is obtained using the resin composition of the present disclosure is preferably 3.5% or less, more preferably 2% or less, and even more preferably 1.5% or less, as measured using a haze meter (NDH2000 manufactured by Nippon Denshoku Industries Co., Ltd.) as defined in JIS K7105. If the total haze is more than 3.5%, the transparency of the film tends to be impaired.

The "total haze (%)" is the diffuse light transmission of a test piece divided by the total light transmission, expressed as a percentage. The lower the total haze value, the better the film transparency.

Incidentally, the glass transition temperature of the resin composition of the present disclosure is typically lower than the glass transition temperature of the polyamide resin (A) alone, preferably by about 3° C. to 50° C., and more preferably by about 9° C. to 20° C.

A molded object that is obtained using the resin composition of the present disclosure can be used not only as a virgin product, but also as a crushed product of a molded object (e.g., when reusing recycled material) that is to be melted and molded again. For the melt-molding method, mainly extrusion molding methods (T-die extrusion, inflation extrusion, blow molding, melt spinning, heterogeneous extrusion, etc.) and injection molding methods are used. The melt-molding temperature is typically 160° C. to 300° C., preferably 200° C. to 260° C., and more preferably 210° C. to 240° C. If the melt-molding temperature is too low, the melt moldability tends to be impaired due to insufficient flowability. On the other hand, if the melt-molding temperature is too high, the resin composition tends to thermally deteriorate, causing appearance defects such as fish eyes or coloring.

When the resin composition of the present disclosure is molded into a single-layer film or sheet, the thickness depends on the application but is typically 5 μm to 2,000 μm, preferably 10 μm to 500 μm, and more preferably 10 μm to 200 μm.

Furthermore, when the resin composition of the present disclosure is molded into a film or sheet it can be used not only as a molded object constituted by this resin composition alone but also as a multilayer structure having at least one layer made of the resin composition of the present disclosure that is to be molded into various molded objects.

Examples of the method for manufacturing the multilayer structure include a method in which a thermoplastic resin is melted and extruded onto a film or sheet containing the resin composition of the present disclosure; a method in which, conversely, the resin composition of the present disclosure is melted and extruded onto a base material constituted by a thermoplastic resin or the like; a method in which the resin composition of the present disclosure and another resin such as a thermoplastic resin are co-extruded; and a method in which a film or sheet containing the resin composition of the present disclosure and a film or sheet containing another material are dry-laminated using a known adhesive such as an organotitanium compound, an isocyanate compound, a polyester compound, or a polyurethane compound.

Of these methods, a method in which the resin composition of the present disclosure and another resin such as a thermoplastic resin are co-extruded is preferable because it is easy to manage the operations. Examples of the resin such as a thermoplastic resin with which the resin composition is to be co-extruded include polyolefin resin, polyester resin, polyamide resin, copolymerized polyamide, polystyrene resin, polyvinyl chloride resin, polyvinylidene chloride, acrylic resin, vinyl ester resin, polyester elastomer, polyurethane elastomer, chlorinated polyethylene, chlorinated polypropylene, aromatic and aliphatic polyketone, and aliphatic polyalcohol. In particular, polyolefin resin is preferably used because of its excellent mechanical properties, extrusion processability, and ability to be used in a wide variety of molded-object applications.

There is no particular limitation on the polyolefin resin, but, for example, linear low-density polyethylene (LLDPE), low-density polyethylene (LDPE), very-low-density polyethylene (VLDPE), ethylene-vinyl acetate copolymer (EVA), and an ionomer are preferred for excellent resistance to flexural fatigue and vibration fatigue of the laminated packaging materials obtained therefrom.

When the resin composition of the present disclosure is used to obtain a multilayer structure, as long as the structure is in the form of a film, sheet, bottle, pipe, or tube, the layer configuration is not limited to a two-layer structure a/b (where a layer containing the resin composition of the present disclosure is taken as a (a1, a2, . . . ) and a layer containing another material such as a thermoplastic resin is taken as b (b1, b2, . . . )) and it is possible to employ any combination of the layers such as b/a/b, a/b/a, a1/a2/b, a/b1/b2, b2/b1/a/b1/b2, b1/b2/a/b3/b4, or a1/b1/a2/b2.

Furthermore, when the resin composition is formed into fibrous or filamentous molded objects as well, the resin composition of the present disclosure and another material may be combined in a similar manner, and it is possible to employ any combination of the materials such as a bimetallic (a and b) type, a core (a)—sheath (b) type, a core (b)—sheath (a) type, or an eccentric core-sheath type.

In the above-described multilayer structure, an adhesive resin layer may be provided between the layers as necessary. The resin used for the adhesive resin layer cannot re clearly defined because it depends on the type of resin used for the other layers b above, but examples thereof include a modified olefin polymer containing a carboxy group obtained by chemically bonding an unsaturated carboxylic acid or an anhydride thereof to an olefinic polymer through an addition reaction or graft reaction.

Specifically, preferred examples thereof include a mixture of one or at least two selected from the group consisting of a maleic-anhydride-grafted polyethylene, a maleic-anhydride-grafted polypropylene, a maleic-anhydride-grafted ethylene-propylene (block or random) copolymer, a maleic-anhydride-grafted ethylene-ethyl acrylate copolymer, a maleic-anhydride-grafted ethylene-vinyl acetate copolymer, and the like. In this case, the amount of unsaturated carboxylic acid or an anhydride thereof contained in the olefin polymer is preferably 0.001 wt. % to 3 wt. %, more preferably 0.01 wt. % to 1 wt. %, and even more preferably 0.03 wt. % to 0.5 wt. %. If the degree of modification in the modified product is too low, the adhesion tends to be insufficient. On the other hand, if the degree of modification is too high, the moldability tends to be poor.

These adhesive resins can also be blended with the resin composition of the present disclosure, other EVOHs, rubber/elastomer components such as polyisobutylene or ethylene-propylene rubber, and the resins in the above-described layer b (the layer to which a layer containing the resin composition of the present disclosure is caused to adhere). In particular, it is also possible to blend a polyolefin resin that is different from the polyolefin resin contained as a main component in the adhesive resin.

The thickness of each layer of the above-described multilayer structure cannot be clearly defined because it depends on the layer configuration, the type of layer b above, the application or the shape of the molded object, the required physical properties, and the like, but typically the thickness of the layer a is selected from the range of preferably about 5 μm to 2,000 μm, more preferably about 10 μm to 500 μm, and even more preferably about 10 μm to 200 μm; the thickness of the layer b is selected from the range of preferably about 5 μm to 5,000 μm and more preferably about 30 μm to 1,000 μm; and the thickness of the adhesive resin layer is selected from the range of preferably about 5 μm to 400 μm and more preferably about 10 μm to 150 μm. Furthermore, regarding the thickness ratio between the layer a and the adhesive resin layer, the layer a is typically thicker than the adhesive resin layer, and the ratio (thickness ratio) of the layer a to the adhesive resin layer is typically 1 to 100, preferably 1 to 50, and more preferably 1 to 10.

Furthermore, regarding the thickness ratio between the layer a and the layer b in the multilayer structure, the layer b is typically thicker than the layer d when all the thicknesses of the same type of layers in the multilayer structure are added together, and the ratio (thickness ratio) of the layer b to the layer a is typically 1 to 100, preferably 3 to 20, and more preferably 6 to 15. If the layer a is too thin, the mechanical properties such as rigidity and shock resistance tend to be insufficient and thickness control tends to be unstable, while if it is too thick the flexural fatigue resistance tends to be poor and the layer tends to be uneconomical. Furthermore, if the layer b is too thin, the rigidity tends to be insufficient, while if it is too thick the flexural fatigue resistance tends to be poor and the weight tends to increase. Meanwhile, if the adhesive resin layer is too thin, the interlayer adhesion tends to be insufficient and thickness control tends to be unstable, while if it is too thick the weight tends to increase and the layer tends to be uneconomical. Furthermore, as long as the effects of the present disclosure are not inhibited, each layer of the multilayer structure may contain the various additives mentioned above, modifiers other than the modified EVOH (B) that is used in the present disclosure, fillers, other resins, and the like in order to improve the moldability and various physical properties.

Furthermore, in order to improve the physical properties of the multilayer structure, it is also preferable to perform stretching. The stretching can be either uniaxial or biaxial stretching, and stretching at the highest possible ratio is better in terms of physical properties and produces molded objects such as stretched films, stretched sheets, stretched containers, and stretched bottles without pinholes, cracks, uneven stretching, delaminations, or the like during stretching. Examples of stretching methods include roll stretching, tenter stretching, tubular stretching, and stretch-blow methods, as well as deep draw molding and vacuum/pressure molding with a high stretch ratio. For biaxial stretching, either simultaneous biaxial stretching or sequential biaxial stretching can be employed. The stretching temperature is selected from the range of typically about 40° C. to 170° C. and preferably about 60° C. to 160° C. If the stretching temperature is below 40° C., the stretchability tends to be poor. On the other hand, if the stretching temperature is above 170° C., it tends to be difficult to maintain a stable stretched state.

After the stretching is complete, heat fixing is also preferred for the purpose of imparting dimensional stability to stretched film. Heat fixing can be performed using well-known means, and the stretched film is heat-treated at typically 80° C. to 180° C. and preferably 100° C. to 165° C., typically for about 2 to 600 seconds while keeping the film under tension. Furthermore, if the film is to ve used for heat-shrinkable packaging of raw meat, processed meat, cheese, or the like, a product film is formed without performing heat fixing after stretching, and, once the above-mentioned raw meat, processed meat, cheese, or the like has been wrapped in the film, heat treatment is performed at typically 50° C. to 130° C. and preferably 70° C. to 120° C., typically for about 2 to 300 seconds, so that the film can be heat-shrinked to realize tight packaging.

The multilayer structure can be used as it is in various shapes such as films, sheets, tapes, bottles, pipes, filaments, and different cross-sectional extrusions. In the case of obtaining cup- or tray-shaped multilayer containers from multilayer sheets or multilayer films, a draw molding method is employed, such as a vacuum molding method, a pressure molding method, a vacuum/pressure molding method, or a plug-assisted vacuum/pressure molding method. Furthermore, in the case of obtaining tube- or bottle-Shaped multilayer containers from multilayer parisons (hollow tubular preliminary molded objects before blowing), a blow molding method is employed, such as an extrusion blow molding method (twin head type, mold transfer type, parison shift type, rotary type, accumulator type, horizontal parison type, etc.), a cold parison type blow molding method, an injection blow molding method, or a biaxial stretch blow molding method (an extrusion cold parison biaxial stretch blow molding method, injection cold parison biaxial stretch blow molding method, injection molding in-line biaxial stretch blow molding method, etc.). The resulting multilayer structure can be heated, cooled, rolled, printed, dry-laminated, solution- or melt-coated, bagged, deep-drawn, boxed, tubed, Split, or otherwise processed as necessary.

Polyamide Resin Modifier

Next, a polyamide resin modifier of the present disclosure will be described.

As the polyamide resin modifier of the present disclosure, the aliphatic-polyester-modified EVOH (B) that is used in the resin composition of the present disclosure is used as a modifier for polyamide resins.

As described above, the modified EVOH (B) is miscible with the polyamide resin (A), and thus a resin composition obtained by blending the modified EVOH (B) as a modifier into the polyamide resin (A) is a composition in which an amorphous part of the polyamide resin (A) and the modified EVOH (B) are fully dissolved in each other. As a result, the resin composition has a lower glass transition temperature (Tg), excellent tensile fracture strain properties, and excellent moldability. Accordingly, a molded object obtained from the resin composition is advantageous in that its original transparency and solvent resistance are not impaired and excellent quality is maintained.

The details of the modified EVOH (B) that is the polyamide resin modifier of the present disclosure are as described above, and thus a description thereof has been omitted.

Furthermore, the details of the polyamide resin that is to be modified with the modified EVOH (B) that is the polyamide resin modifier of the present disclosure are also as described above as the polyamide resin (A), and thus a description thereof has been omitted.

When the modified EVOH (B) that is the polyamide resin modifier of the present disclosure is blended into the polyamide resin (A) to modify its physical properties, the blending ratio is set as appropriate according to the degree of modification required and the shape and application of the resulting molded object. However, typically it is preferable to set the content of the modified EVOH (B) to 1 part by weight or more and less than 50 parts by weight when the total content of the polyamide resin (A) and the modified EVOH (B) is taken as 100 parts by weight.

More specifically, the lower limit of the content of the modified EVOH (B) is preferably 1 part by weight, more preferably 5 parts by weight or more, and even more preferably 10 parts by weight or more. Furthermore, the upper limit of the content of the modified EVOH (B) is preferably less than 50 parts by weight, more preferably 45 parts by weight or less, even more preferably 40 parts by weight or less, even more preferably 30 parts by weight or less, and even more preferably 20 parts by weight or less. Of these ranges, the content of the modified EVOH (B) is preferably 1 part by weight or more and 45 parts by weight or less, more preferably 1 part by weight or more and less than 40 parts by weight, and even more preferably 1 part by weight or more and less than 20 parts by weight.

That is to say if the content of the modified EVOH (B) is too large and exceeds the above-described range, the miscibility of the two resins (A) and (B) tends to become unbalanced; the transparency, the solvent resistance, and the moldability of the obtained molded object tend to be impaired; and, furthermore, the effect of improving the tensile fracture strain properties tends to be lost. On the other hand, if the content of the modified EVOH (B) is too small, the effect of modifying the polyamide resin (A) tends to be lost.

Furthermore, there is no particular limitation on the form of the modified EVOH (B) that is the polyamide resin modifier of the present disclosure, and examples thereof include a powder, a pellet, a solution, and a dispersion.

EXAMPLES

Hereinafter, examples of the present disclosure will be specifically described along with comparative examples. Note that the present disclosure is not limited to the following examples as long as they do not exceed the gist of the present disclosure.

Materials

First, the details of the materials used in the examples and comparative examples are given below.

Polyamide resin (A1): Nylon 6 (grade NOVAMID (registered trademark) 1022BLMJ manufactured by Mitsubishi Engineering-Plastics Corporation)

Polyamide resin (A2: Nylon 6 (grade NOVAMID (registered trademark) 1020 manufactured by DSM)

Aliphatic-polyester-modified EVOH (B1): ethylene content 32 mol %, degree of saponification 99.6%, graft modification rate 12.5 mol %, average chain length of aliphatic polyester 1.4 mol, glass transition temperature 18° C.

Aliphatic-polyester-modified EVOH (B2): ethylene content 44 mol %, degree of saponification 99.6%, graft modification rate 7.3 mol %, average chain length of aliphatic polyester 1.4 mol, glass transition temperature 20° C.

Unmodified EVOH: ethylene content 32 mol %, degree of saponification 99.6%, glass transition temperature 61° C.

Pulyolefin elastomer: Tafmer MH7010 manufactured by Mitsui Chemicals, Inc., glass transition temperature −50° C.

Polyester elastomer: GQ430 manufactured by Mitsubishi Chemical Corporation, glass transition temperature −50° C.

Styrene elastomer: Tuftec M1913 manufactured by Asahi Kasei Chemicals Corporation, glass transition temperature −45° C.

Evaluation Items (Evaluation Method and Evaluation Criteria)

The details of the evaluation items for samples of the examples and comparison examples are shown below.

(1) Tensile Fracture Strain

Pellets made of the resin compositions used in the examples and comparative examples were used to prepare ISO 3167 Type A test pieces using an injection molding machine, and thus samples for tensile fracture-strain measurement were obtained. The samples were then subjected to tensile testing using a tensile testing machine (Autograph AGS-H manufactured by Shimadzu Corporation) under the following conditions, and thus the strain at fracture (%) was measured.

Test conditions: ISO 527

Temperature/humidity conditions: 23° C., 50% RH

Tensile speed: 50 mm/min (2) Transparency (Internal Haze, Total Haze)

Pellets made of the resin compositions used in the examples and comparative examples were used to prepare 30 μm-thick single-layer films. The single-layer films were then subjected to transparency testing using a haze meter (NDH2000 manufactured by Nippon Denshoku Industries Co., Ltd.), as defined in JIS K7105, and thus the total haze (%) was measured. As described above, the "total haze (%)" is the diffuse light transmission of a test piece divided by the total light transmission, expressed as a percentage. The lower the total haze value, the better the film transparency. In order to evaluate the internal haze of the film, the internal haze (%) was measured using a sample with liquid paraffin applied to both sides of the film at the time of measurement, with the effect of unevenness on the film surface removed.

(3) Solvent Resistance: Toluene

Pellets made of the resin compositions used in the examples and comparative examples were used to prepare test pieces with a size of length 50 mm×width 25 mm×thickness 2 mm using an injection molding machine. The obtained test pieces were immersed in toluene in a constant-temperature room at 23° C. and 50% PH and left to stand for one week. The weight increase rate (g/100 g of resin) at that time was evaluated.

(4) Glass Transition Temperature

The states of samples (pellets) made of the resin compositions used in the examples and comparative examples were observed using a differential scanning calorimeter (Diamond DSC manufactured by Perkin Elmer) as they were heated, and the glass transition temperature was calculated.

(a) Conditioning of test piece: The test piece was heated to 250° C. and then cooled to −30° C. at a cooling rate of 10° C./min.

(b) Analysis of glass transition temperature: The test piece cooled in (a) was heated to 250° C. at a temperature rise rate of 10° C./min.

(c) Calculation of glass transition temperature: The glass transition temperature was calculated as a midpoint temperature of a stepwise change portion of the glass transition from the DSC curve obtained in (b).

(5) Moldability (Blocking)

samples (pellets) made of the resin compositions used in Examples 3 and 4 and Comparative Example 6 were heated at 150° C. for 5 hours. After heating, the pellets were visually observed to see whether blocking had occurred. The pellets were evaluated as "no blocking" if no blocking was observed and "blocking observed" if blocking was observed. If blocking occurs, the pellets lose flowability, causing clogging in a hopper tank, a hopper, or the like during molding, resulting in poor moldability.

Example 1

Polyamide resin (A1) and aliphatic-polyester-modified EVOH (B) were introduced at the weight ratio shown in Table 1 below from a material feed port into a cylinder of a twin-screw kneading extruder (TEX32 manufactured by The Japan Steel Works, Ltd.) and conveyed to a kneading zone set to a temperature of 240° C. so that the materials were melted and blended, and the melted and blended product was extruded into strands from a die attached to the discharge port. The obtained stranded extrudate was pelletized by a resin pelletizer to obtain a pellet-like resin composition.

Example 2

A pellet-like resin composition was obtained in a similar way to that of Example 1, except that the amount of polyamide resin (A1) was changed to 80 parts by weight and the amount of aliphatic-polyester-modified EVOH (B1) was changed to 20 parts by weight.

Examples 3 and 4 and Comparative Examples 1 to 7

A pellet-like resin composition was obtained in a similar way to that of Example 1, except that the type and weight ratio of resins combined were changed as shown in Table 1 below.

The obtained samples of Examples 1 to 4 and Comparative Examples 1 to 7 were measured and evaluated in terms of the above-described evaluation items (tensile fracture strain, transparency (internal haze and total haze), solvent resistance, glass transition temperature, and moldability (blocking)). Table 1 below shows the results.

TABLE 1

| | | | Example | | | | Comparative Example | | | | | | |
|---|---|---|---|---|---|---|---|---|---|---|---|---|---|
| | | | 1 | 2 | 3 | 4 | 1 | 2 | 3 | 4 | 5 | 6 | 7 |
| Resin composition (parts by weight) | Polyamide resin (A1) | | 90 | 80 | — | — | 80 | 80 | 80 | 100 | — | — | — |
| | Polyamide resin (A2) | | — | — | 80 | 55 | — | — | — | — | 100 | 45 | 80 |
| | Aliphatic-polyester-modified EVOH (B1) | | 10 | 20 | — | — | — | — | — | — | — | — | — |
| | Aliphatic-polyester-modified EVOH (B2) | | — | — | 20 | 45 | — | — | — | — | — | 55 | — |
| | Polyolefin elastomer | | — | — | — | — | 20 | — | — | — | — | — | — |
| | Polyester elastomer | | — | — | — | — | — | 20 | — | — | — | — | — |
| | Styrene elastomer | | — | — | — | — | — | — | 20 | — | — | — | — |
| | Unmodified EVOH | | — | — | — | — | — | — | — | — | — | — | 20 |
| Evaluation | Tensile fracture strain (%) | | 510 | 600 | 178 | 266 | 480 | 150 | 350 | 28 | 103 | 261 | 75 |
| | Solvent resistance: toluene (g/100 g of resin) | | 0.41 | 0.41 | 0.04 | 0.04 | 0.59 | 1.74 | 0.72 | 0.57 | 0.08 | 0.05 | 0 |
| | Transparency | Internal haze (%) | 0.1 | 0.3 | 0 | 0 | 9 | 0.8 | 0.1 | 0.1 | 0.3 | 0 | 0 |
| | | Total haze (%) | 0.6 | 1.5 | 1 | 3.1 | 16 | 1.9 | 25 | 1 | 0.9 | 2.5 | 0.9 |
| | Glass transition temperature (° C.) | | 40.1 | 33 | 35.2 | 19.6 | 49.7 | 50.2 | 50.4 | 50.1 | 51 | Unmeasurable* | 48.9 |
| | Moldability (blocking) | | — | — | No blocking | No blocking | — | — | — | — | — | Blocking observed | — |

*Measurement was impossible due to multiple stepwise change portions in the DSC curve.

It is seen from these results that the samples of Examples 1 to 4 exhibited good properties in all evaluation items, while the samples of Comparative Examples 1 to 7 were poorly evaluated in at least one of the tensile fracture strain, the solvent resistance, the transparency, the glass transition temperature, and the moldability, indicating that their effect in modifying the polyamide resin (A) was insufficient.

Specific aspects of the present disclosure were described in the above-described examples, but the above-described examples are merely examples and should not be construed as limiting the present disclosure. Various alterations that are obvious to those skilled in the art are intended to be within the scope of the present disclosure.

INDUSTRIAL APPLICABILITY

The present disclosure relates to a resin composition containing a polyamide resin (A) and an aliphatic-polyester-modified EVOH (B), a molded object obtained therefrom, a modifier therefor, and a method for modifying a polyamide resin. The resin composition has excellent moldability, and the obtained molded object has excellent transparency, tensile fracture strain properties, and solvent resistance, and thus can be widely used.

The invention claimed is:

1. A resin composition consisting of: a polyamide resin (A); a modified ethylene-vinyl alcohol resin (B) grafted with an aliphatic polyester; and other components,
- wherein the content of the modified ethylene-vinyl alcohol resin (B) is 1 part by weight or more and less than 50 parts by weight, when the total content of the polyamide resin (A) and the modified ethylene-vinyl alcohol resin (B) is taken as 100 parts by weight,
- wherein the other components are present in an amount of 5 wt % or less of an entire resin composition, and
- the other components comprise at least one selected from the group consisting of carboxylic-acid-modified polyolefin resin, a hydrocarbon resin with a number-average molecular weight of 100 to 3,000, and a softening point of 60° C. or more and less than 170° C., an antioxidant, a lubricant, an antistatic agent, a colorant, an ultraviolet absorber, a plasticizer, a thermal stabilizer, a light stabilizer, a surfactant, an antibacterial agent, a drying agent, an antiblocking agent, a flame retardant, a cross-linking agent, a curing agent, a foaming agent, a crystal nucleating agent, an antifogging agent, a biodegradable additive, and a silane coupling agent.

2. The resin composition according to claim 1, wherein the content of the modified ethylene-vinyl alcohol resin (B) is 1 to 45 parts by weight, when the total content of the polyamide resin (A) and the modified ethylene-vinyl alcohol resin (B) is taken as 100 parts by weight.

3. The resin composition according to claim 1, wherein a modification rate of the modified ethylene-vinyl alcohol resin (B) is 0.1 mol % to 30 mol %.

4. The resin composition according to claim 1, wherein, in the modified ethylene-vinyl alcohol resin (B), the grafted aliphatic polyester is a ring-opening polymer of a lactone ring, and the number of carbon atoms constituting the lactone ring is 3 to 10.

5. The resin composition according to claim 1, wherein the total haze of a 30 μm-thick single-layer film obtained using the resin composition is 2% or less, as measured using a haze meter as defined in JIS K7105.

6. A molded object made of the resin composition according to claim 1.

7. The molded object according to claim 6, wherein the molded object is a sheet or a film.

8. A method for modifying a polyamide resin (A) by blending only a modified ethylene-vinyl alcohol resin (B) grafted with an aliphatic polyester; and other components into the polyamide resin (A), comprising:
- setting the content of the modified ethylene-vinyl alcohol resin (B) to 1 part by weight or more and less than 50 parts by weight, when the total content of the polyamide resin (A) and the modified ethylene-vinyl alcohol resin (B) is taken as 100 parts by weight; and
- setting the content of the other components to 5 wt % or less of the total content of the polyamide resin (A), the modified ethylene-vinyl alcohol resin (B), and the other components, and
- the other components comprise at least one selected from the group consisting of carboxylic-acid-modified polyolefin resin, a hydrocarbon resin with a number-average molecular weight of 100 to 3,000, and a softening point of 60° C. or more and less than 170° C., an antioxidant, a lubricant, an antistatic agent, a colorant, an ultraviolet absorber, a plasticizer, a thermal stabilizer, a light stabilizer, a surfactant, an antibacterial agent, a drying agent, an antiblocking agent, a flame retardant, a cross-linking agent, a curing agent, a foaming agent, a crystal nucleating agent, an antifogging agent, a biodegradable additive, and a silane coupling agent.

9. The resin composition according to claim 1, wherein a content of the modified ethylene-vinyl alcohol resin (B) is 1 to 10 parts by weight, when a total content of the polyamide resin (A) and the modified ethylene-vinyl alcohol resin (B) is taken as 100 parts by weight.

10. The resin composition according to claim 1, wherein a number-average molecular weight of the modified ethylene-vinyl alcohol is 5,000 to 300,000.

11. The resin composition according to claim 1, wherein a number-average molecular weight of the modified ethylene-vinyl alcohol is 10,000 to 100,000.

12. The resin composition according to claim 1, wherein a glass transition temperature of the resin composition is lower than a glass transition temperature of the polyamide resin (A) by 3 to 50° C.

13. The resin composition according to claim 1, wherein a glass transition temperature of the resin composition is lower than a glass transition temperature of the polyamide resin (A) by 8 to 20° C.

14. The resin composition according to claim 1, wherein the other components includes carboxylic-acid-modified polyolefin resin (C).

15. A resin composition consisting of: a polyamide resin (A); and a modified ethylene-vinyl alcohol resin (B) grafted with an aliphatic polyester,
- wherein the content of the modified ethylene-vinyl alcohol resin (B) is 1 part by weight or more and less than 50 parts by weight, when the total content of the polyamide resin (A) and the modified ethylene-vinyl alcohol resin (B) is taken as 100 parts by weight.

* * * * *